United States Patent

Muthiah et al.

[11] Patent Number: 5,922,473
[45] Date of Patent: Jul. 13, 1999

[54] DUAL THERMAL AND ULTRAVIOLET CURABLE POWDER COATINGS

[75] Inventors: Jeno Muthiah, Wernersville; Andrew T. Daly, Sinking Spring; Richard P. Haley; Joseph J. Kozlowski, both of Reading, all of Pa.

[73] Assignee: Morton International, Inc., Chicago, Ill.

[21] Appl. No.: 08/780,121

[22] Filed: Dec. 26, 1996

[51] Int. Cl.$^6$ .............. B32B 27/16; B32B 27/26; B32B 27/30; B32B 27/36

[52] U.S. Cl. .............. 428/481; 428/480; 428/482; 427/458; 427/475; 427/487; 427/493; 427/496; 427/500; 427/508; 427/514; 427/521; 427/180; 427/189; 427/195; 427/372.2; 427/375; 427/385.5; 427/389.9; 427/391; 427/392; 427/393; 522/7; 522/8; 522/11; 522/12; 522/13; 522/18; 522/24; 522/28; 522/38; 522/40; 522/46; 522/104; 522/106; 522/108

[58] Field of Search .................. 428/339, 480, 428/481, 482, 483; 528/302, 303, 306; 522/6, 7, 8, 11, 12, 13, 18, 24, 28, 90, 93, 97, 98, 104, 106, 107, 108, 38, 40, 46; 427/458, 475, 487, 493, 496, 500, 508, 514, 521, 180, 189, 195, 372.2, 375, 385, 389.9, 391, 392, 393

[56] References Cited

U.S. PATENT DOCUMENTS

| | | |
|---|---|---|
| 3,933,875 | 1/1976 | Brose et al. .............. 428/413 |
| 3,935,330 | 1/1976 | Smith et al. .............. 427/41 |
| 4,024,296 | 5/1977 | Gruber .............. 427/53 |
| 4,113,894 | 9/1978 | Koch, II .............. 427/44 |
| 4,129,488 | 12/1978 | McGinniss .............. 204/159.19 |
| 4,246,298 | 1/1981 | Guarnery et al. .............. 427/46 |
| 4,605,465 | 8/1986 | Morgan .............. 156/273.3 |
| 4,634,602 | 1/1987 | Sirkoch et al. .............. 427/44 |
| 4,753,817 | 6/1988 | Meixner et al. .............. 427/54.1 |
| 4,788,108 | 11/1988 | Saunders, Jr. et al. .............. 428/481 |
| 4,980,113 | 12/1990 | Cummings et al. .............. 264/255 |
| 5,106,651 | 4/1992 | Tyger et al. .............. 427/54.1 |
| 5,300,331 | 4/1994 | Schaeffer .............. 427/493 |
| 5,486,384 | 1/1996 | Bastian et al. .............. 427/493 |
| 5,532,027 | 7/1996 | Nordstrom et al. .............. 427/493 |
| 5,710,208 | 1/1998 | Bederke et al. .............. 524/513 |
| 5,723,512 | 3/1998 | Leppard et al. .............. 522/55 |
| 5,763,099 | 6/1998 | Misev et al. .............. 428/482 |
| 5,767,169 | 6/1998 | Leppard et al. .............. 522/64 |
| 5,824,373 | 10/1998 | Biller et al. .............. 427/474 |

FOREIGN PATENT DOCUMENTS

| | | |
|---|---|---|
| 0636669A2 | 2/1995 | European Pat. Off. . |
| 2947597B1 | 11/1980 | Germany . |
| WO93/19132 | 9/1993 | WIPO . |

OTHER PUBLICATIONS

G.K. Noren et al. (DSM Resins, Inc.), *Non–Acrylate UV–Curable Systems Containing Maleate and Vinyl Ether Functional Components*, presented at Water–Borne & Higher–Solids, and Powder Coatings Symposium in New Orleans, LA, Feb. 1993.

F.M. Witte & E.S. de Jong (DSM, N.V.), *Powder Coatings on Heat Sensitive Substrates*, presented at DSM, N.V. seminar in Amsterdam, Mar. 1996.

D.S. Richart, *Applying Powder on a Wooden Substrate*, Powder Coating, pp. 55–56, Apr. 1996.

K.M. Biller & B. MacFadden (Herberts Powder Coatings), *UV Curable Powder Coatings: The Perfect Marriage of Compliant Coatings*, presented at International UV/EB Processing Conference, Nashville, TN, Apr. 1996.

K.M. Biller & B. MacFadden (Herberts Powder Coatings), *UV–Curable Powders: A Marriage of Compliant Coatings*, Industrial Paint & Powder, pp. 22–25, Jul. 1996.

*Primary Examiner*—Vivian Chen
*Attorney, Agent, or Firm*—Steven C. Benjamin; Gerald K. White

[57] ABSTRACT

Opaquely pigmented or thick filmed powder coatings for heat sensitive substrates, such as wood, wood composites, for example, medium density fiber board, and plastics, that can be fully cured, especially near the substrate, through the incorporation of a dual cure system in the powder comprising a thermal initiator, such as a peroxide, along with a UV initiator. The UV initiator cures the surface, while the thermal initiator cures at the substrate. Surprisingly, virtually no pregelation occurs during the heated melt and flow out step prior to UV curing. Consequently, the hardened film finish formed on the surface exhibits exceptional smoothness which is comparable to that of traditional UV curable powders. The hardened film finish is also fully cured throughout and exhibits exceptional adhesion to the substrate which cannot be achieved with traditional UV curable powders that have been pigmented. Although the dual cure system includes a thermal aspect, these powder coatings are especially suited for coating heat sensitive substrates. The dual thermal and UV curable powders still cure at significantly lower temperatures and significantly faster rates than traditional heat curable powders to make them safe for coating heat sensitive substrates.

28 Claims, No Drawings

DUAL THERMAL AND ULTRAVIOLET CURABLE POWDER COATINGS

FIELD OF THE INVENTION

The present invention relates to powder coatings and more particularly to opaquely pigmented or thick filmed ultraviolet (UV) radiation curable powder coatings that can be cured not only at the surface, but also down through the coating to the substrate. Full cure can be obtained despite the presence of opaque pigments or thick films that normally impede the penetration of radiation in the coating and, consequently, inhibit cure below the surface. This is accomplished by incorporating a thermal initiator in the UV curable powder coatings together with the usual UV initiator. Surprisingly, the presence of a thermal initiator does not detract from the exceptional smoothness of the hardened film finishes. The dual thermal and UV curable powder coatings of the present invention are especially suited for coating over heat sensitive substrates, such as wood and plastic, since these coatings cure at faster speeds and/or lower temperatures, reducing the potentially damaging heat load on the substrate.

BACKGROUND OF THE INVENTION

Powder coatings, which are dry, finely divided, free flowing, solid materials at room temperature, have gained considerable popularity in recent years over liquid coatings for a number of reasons. For one, powder coatings are user and environmentally friendly materials, since they are virtually free of harmful fugitive organic solvent carriers that are normally present in liquid coatings. Powder coatings, therefore, give off little, if any, volatile materials to the environment when cured. This eliminates the solvent emission problems associated with liquid coatings, such as air pollution and dangers to the health of workers employed in coating operations.

Powder coatings are also clean and convenient to use. They are applied in a clean manner over the substrate, since they are in dry, solid form. The powders are easily swept up in the event of a spill and do not require special cleaning and spill containment supplies, as do liquid coatings. Working hygiene is, thus, improved. No messy liquids are used that adhere to worker's clothes and to the coating equipment, which leads to increased machine downtime and clean up costs.

Powder coatings are essentially 100% recyclable. Over sprayed powders can be fully reclaimed and recombined with the powder feed. This provides very high coating efficiencies and also substantially reduces the amount of waste generated. Recycling of liquid coatings during application is not done, which leads to increased waste and hazardous waste disposal costs.

Despite their many advantages, powder coatings are generally not employed in coating heat sensitive substrates, such as wood and plastic. Heat sensitive substrates demand lower cure temperatures, preferably below 250° F., to avoid significant substrate degradation and/or deformation. Lower cure temperatures are not possible with traditional heat curable powders. Unsuccessful attempts have been made to coat heat sensitive substrates with traditional powders.

For instance, when wood composites, e.g., particle board, fiber board, and other substrates that contain a significant amount of wood, are heated to the high cure temperatures required for traditional powders, the residual moisture and resinous binders present in the wood composites for substrate integrity are caused to invariably evolve from the substrate. Outgassing of the volatiles during curing results in severe blisters, craters, pinholes, and other surface defects in the hardened film finish. Furthermore, overheating causes the wood composites to become brittle, friable, charred, and otherwise worsened in physical and chemical properties. This is unacceptable from both a film quality and product quality viewpoint.

Low temperature UV curable powders have recently been proposed for coating heat sensitive substrates. UV powders still require exposure to heat, which is above either the glass transition temperature ($T_g$) or melt temperature ($T_m$), to sufficiently melt and flow out the powders into a continuous, smooth, molten film over the substrate prior to radiation curing. However, the heat load on the substrate is significantly reduced, since UV powders are formulated to melt and flow out at much lower temperatures than traditional powder coatings, typically on the order of about 200° F. Therefore, UV powders only need to be exposed to enough low temperature heat required to flow out the powders into a smooth molten film.

Curing or hardening of UV powders is accomplished by exposing the molten film to light from a UV source, such as a mercury UV lamp, which rapidly cures the film. Since the crosslinking reactions are triggered with UV radiation rather than heat, this procedure allows the powder coatings to be cured more quickly and at much lower temperatures than traditional heat curable powders.

Another significant advantage of UV curable powders is that the heated flow out step is divorced from the UV cure step. This enables the UV powders to completely outgas substrate volatiles during flow out and produce exceptionally smooth films prior to the initiation of any curing reactions. Accordingly, the film finishes created with UV powders are known to have extraordinary smoothness.

One drawback is that opaque pigmentation of UV curable powders is known to be problematic. Opaque pigments inherently absorb, reflect, or otherwise interfere with the transmittance of UV light through the pigmented coating, and, consequently, impede the penetration of UV light into the lower layers of the pigmented film during curing. Pigmented UV powders, when cured, can still provide exceptionally smooth film finishes with good surface cure properties, including good solvent resistance. However, pigmented UV powders are not able to be adequately cured down through the film to the underlying substrate. As a result, pigmented UV powder coatings exhibit poor through cure properties, including poor pencil hardness, poor adhesion, and poor flexibility. Clear UV powder formulations which are applied as thicker films greater than about 2 mils present similar curing problems. Most UV curable powder coatings produced today are formulated as thin clear coats for wood and metals without pigmentation.

EP Publication No. 0 636 669 A2 to DSM, N.V. dated Feb. 1, 1995 discloses UV or electron beam radiation curable powder coatings which can be applied to heat sensitive substrates, such as wood, e.g., medium density fiber board, and plastic. The UV powders of EP 0 636 669 A2 contain: a) an unsaturated resin from the group of (semi)crystalline or amorphous unsaturated polyesters, unsaturated polyacrylates, and mixtures thereof, with unsaturated polyesters derived from maleic acid and fumaric acid being especially preferred; b) a crosslinking agent selected from an oligomer or polymer having vinyl ether, vinyl ester or (meth)acrylate functional groups, with vinyl ether functional oligomers being especially preferred, such as divinyl ether functionalized urethanes; and, c) a photoinitiator for UV or electron beam radiation cure, in which the the equivalent ratio of polymer unsaturation to crosslinker unsaturation is preferably 1:1. However, the UV powders of EP 0 636 669 A2 are practically limited to being formulated as unpigmented, i.e., clear, coatings, as demonstrated in Example 1. A similar clear coat UV powder based on an unsaturated polyester, an allyl ether ester crosslinker, and a hydroxyketone photoinitiator is disclosed in Example 2 of International Publication No. WO 93/19132 to DSM, N.V. dated Sep. 30, 1993.

K. M. Biller and B. MacFadden (Herberts Powder Coatings), *UV-Curable Powders: A Marriage Of Compliant Coatings,* Industrial Paint & Powder, pp. 22–25 (July 1996) and K. M. Biller and B. MacFadden (Herberts Powder Coatings) *UV-Curable Powder Coatings: The Perfect Marriage of Compliant Coatings,* Radtech North America 1996 Conference, pp.437–445 (Apr. 28–May 2, 1996), suggest the incorporation of special solid UV initiators which are designed to activate despite the presence of various pigmentations. Presumably, these special UV initiators have some ability to absorb UV light at wavelengths above the reflectance of the pigments.

F. M. Witt and E. S. de Jong (DSM, N.V.), *Powder Coatings On Heat Sensitive Substrates,* presented at the DSM, N.V. seminar held in Amsterdam (Mar. 27–28, 1996), disclose that some success has been achieved in the laboratory with pigmented UV curable powder coating formulations based on a binder which comprises a blend of: a) an unsaturated polyester resin, e.g., an unsaturated polyester derived from maleic acid; and, b) a vinyl ether functionalized polyurethane crosslinking agent. This binder is similar to that described in the aforementioned EP 0 636 669 A2. In these formulations, a special class of UV photoinitiators especially suited for pigmented UV coatings are used, e.g., bis-acylphosphineoxides and a 75/25 blend of a hydroxyketone (Irgacure 184) and bis-acylphosphineoxide, which is now available as Irgacure 1800 from Ciba-Geigy Corporation. Pigmented formulations with varying amounts of pigments between 5 and 20 wt. % are applied electrostatically to medium density fiber board at a layer thickness of 100 microns. Yet, although sufficient hiding is achieved with pigment loadings at 15 wt. % and 20 wt. % pigment, the pendulum hardness and, consequently, the through cure is not fully developed shortly after UV curing, which is undesirable.

The state of the powder coating art, therefore, is that opaquely pigmented or thick filmed UV curable powder coatings cannot be fully cured with UV light.

U.S. Pat. No. 4,753,817 to Meixner et al. discloses opaquely pigmented liquid UV radiation curable coatings for application to wood, wood-like materials and films of plastic. Such pigmented liquid UV paints are made by incorporating hydroperoxide thermal initiators alongside the UV photoinitiators in liquid resins derived from copolymerizable monomer-free air-drying unsaturated polyesters. The inclusion of the hydroperoxides in the liquid UV formulation is said to improve the cure at the lower layers of the coating that can not be penetrated by UV radiation due to the opacity of the pigments. The liquid paints also contain other essential ingredients not found in powder coatings, including plasticized colloidal cotton, e.g., nitrocellulose, siccatives to promote air-drying, and also volatile organic solvents to adjust the processing viscosity for liquid applications, e.g., toluene, xylene, isopropanol, and butyl acetate. These pigmented UV liquids are first applied to the substrate in liquid form, next pregelled at temperatures of 120° F. to 175° F., and then hardened under UV radiation.

There is nothing in Meixner et al. that provides any indication that solid compositions could be made that are suitable as powder coatings.

In addition, the liquid UV coatings of Meixner et al. have a number of other shortcomings. For example, the UV liquids contain organic solvents, which generate physiologically and environmentally harmful solvent emissions during drying. As previously mentioned, powder coatings are essentially solventless and nonpolluting substances. The UV liquids also have pot lives only up to 5 hours, which is rather short. This would not be a suitable system for a powder coating which must not advance for several weeks at room temperature, especially in a reclaim powder coating booth. Also, cure for the Meixner et al. system occurs between 120 and 175° F. At such temperatures, significant pregelation or even curing during extrusion would result with a powder coating, which, in turn, would cause processing difficulties as the powder would take a set in the extruder, leading to excessive extruder downtime and expensive clean out costs. The UV liquids are based on lower molecular weight polyester resins, which are highly reactive liquids at room temperature that cure without crosslinkers. Typical polyester powder coatings require resins with higher molecular weights or higher $T_g$'s for the material to remain solid at room temperature, which tends to reduce the reactivity of the resin and require a crosslinker. Also, the UV liquids containing lower molecular weight species would be expected to transport more readily into biological tissues. If improperly handled, the highly reactive UV liquids could be transported through the skin of an individual and poisonously affect physiological functions. The use higher molecular weights species in powder coatings reduces handling problems and reduces the risk of invasion into biological tissues.

Moreover, the liquid UV coatings of Meixner et al. do not require an initial melt and flow out step in order to form a smooth film over the substrate, as required with UV powders, since these coatings are liquids at room temperature and inherently flow out as smooth films when poured. Therefore, incorporation of a thermally activated peroxide cure component in a liquid UV coating is not problematic from a film quality standpoint. However, the inclusion of a thermal peroxide cure component in a UV powder coating would be expected to produce coatings having poor flow out behavior and, consequently, poor film qualities. Conventional wisdom would lead one to expect that the addition of a thermal cure component to a UV curable powder would cause pregelation during the heated flow out step and cause undesirable surface roughness, such as orange peel or low gloss, in the hardened film finish, detrimentally affecting the film quality and aesthetic appearance of the coating. Blisters, craters, pinholes, and other surface defects would also be expected to be visually evident on the surface of the hardened film. Additionally, significant pregelation in the extruder during melt blending the powder ingredients would be expected when using a thermal initiator, causing processing difficulties as the powder blend would begin to cure and take a set in the extruder, which would lead to considerable extruder down time and increased clean out costs.

What is needed is an opaquely pigmented and/or thick filmed UV curable powder coating composition that is suitable for coating heat sensitive substrates, especially wood, wood composites, and plastic, and that can be fully cured through the incorporation of a thermal initiator alongside the usual UV initiator without detracting from the exceptional smoothness of the hardened film finish.

SUMMARY OF THE INVENTION

It is an object of this invention, therefore, to provide an opaquely pigmented or thick filmed powder coatings that can be fully cured upon exposure to UV radiation despite the presence of opaque pigments and/or thick films, both of which normally inhibit cure in the coating, through the incorporation of a "dual" cure system, i.e., combination thermal initiator and UV photoinitiator, in the powders, wherein the UV initiator cures the surface, while the thermal initiator cures the lower layers near the substrate, yet without detracting from the exceptional smoothness of the hardened film finish obtained on the surface.

It is another object of this invention to provide dual thermal and UV curable powder coatings that have exceptional smoothness comparable to traditional UV powder coatings.

It is still another object of this invention to provide dual thermal and UV curable powder coatings that have improved through cure properties, including improved adhesion to the substrate, compared to traditional UV curable powder coatings.

It is yet another object of this invention to provide dual thermal and UV curable powder coatings that have relatively low cure temperatures and/or rapid cure speeds for safe curing on heat sensitive substrates without damaging or worsening the substrate.

The present inventors have discovered that the use of dual cure initiators, i.e., a UV initiator along side a thermal initiator, in the powder coatings will give not only excellent surface cure to the film finish, but also superior through cure in the film down to the underlying substrate, while still obtaining exceptional smoothness and desired glossiness in the surface finish. It is quite surprising that the cured powder coating of this invention remains so smooth. Conventional wisdom would lead one to expect that the addition of a thermal cure component to UV curable powders would cause pregelation during the melt and flow out step and, in turn, cause roughness on the surface, such as orange peel or low gloss. Surprisingly, the hardened film finishes produced from powder coatings of this invention are at least as exceptionally smooth as those produced from traditional UV curable powders, while also being fully cured throughout.

The invention resides in a dual thermal and ultraviolet curable powder coating composition, which is a composition in solid particulate form that is a blend of: a) an unsaturated resin selected from unsaturated polyesters, unsaturated polyacrylates, unsaturated polymethacrylates, and mixtures thereof; b) optional second co-polymerizable resin crosslinker having a functional group selected from vinyl ether, acrylate, methacrylate, and allyl ester groups, and mixtures thereof; c) a photoinitiator selected from photolytically activated free radical generating compounds; d) a thermal initiator selected from thermally activated free radical generating compound, such as peroxides, azo compounds, and mixtures thereof; and, e) an opacifier selected from pigments, fillers, and mixtures thereof, wherein the composition can be fully cured, both on the surface and throughout, on a heat sensitive substrate upon exposure of sufficient heat to melt and flow out the powder into a smooth molten film and to activate the thermal component of the cure, followed by exposure of the molten film to sufficient UV radiation to activate the ultraviolet component of the cure and to form a fully cured smooth hardened film.

The various objects, features and advantages of this invention will become more apparent from the following description and appended claims.

DETAILED DESCRIPTION OF THE PREFERRED EMBODIMENTS OF THE INVENTION

Throughout this specification, all parts and percentages specified herein are by weight unless otherwise stated.

Base Resins

The dual, thermal and UV, curable powder coatings of this invention are primarily based on unsaturated polymer resins, such as unsaturated polyester resins, unsaturated polyacrylate or polymethacrylate resins, and/or mixtures thereof The unsaturated polyester resins useful herein are ethylenically unsaturated condensation reaction products of one or more aliphatic or cycloaliphatic di- or polyfunctional alcohols, or mixtures thereof, and one or more aliphatic, cycloaliphatic, or aromatic di- or polyfunctional carboxylic acids, or mixtures thereof. The carboxylic acids can also be used in their corresponding anhydride form. Corresponding lower alkanol esters are also useful for esterification. Small amounts of monofunctional alcohols and monofunctional carboxylic acids or esters thereof may be present for polyester chain termination purposes. Although unsaturation may be supplied by the alcohol, typically the acid is unsaturated and the alcohol is saturated. Saturated acids can also be present to reduce the density of ethylenic unsaturation in the polyester.

Examples of suitable unsaturated di- and polyfunctional carboxylic acids that are useful herein include maleic anhydride, fumaric acid, citraconic anhydride, itaconic acid, endo-cis-bicylco[2,2,1]-5-heptene-2,3-dicarboxylic acid, 1,4,5,6,7,7-hexachlorobicyclo[2,2,1]-5-heptene-2,3-dicarboxylic acid (chlorenedic acid), mesaconic acid, dimeric methacrylic acid, and methylbicyclo[2,2,1]-heptene-2,3-dicarboxylic acid. Maleic anhydride, fumaric acid or mixtures thereof are most preferred. It should be understood that whether acids, anhydrides, or lower alkanol esters are listed here, any of these forms are contemplated for use herein.

Examples of suitable saturated diacids or polyacids that are useful herein in combination with a substantial proportion of an unsaturated diacid, include tetrachlorophthalic acid, tetrabromophthalic acid, phthalic anhydride, adipic acid, tetrahydrophthalic acid, isophthalic acid, terephthalic acid, trimellitic acid, azeleic acid, sebacic acid, dimethylterephthalate, dimethylisophthalate, succinic acid, dodecanedicarboxylic acid, hexahydrophthalic acid, hexaclorooctahydromethanonaphthalene dicarboxylic acid, malonic acid, glutaric acid, oxalic acid, pimelic acid, suberic acid, and pyromellitic anhydride.

Examples of suitable monoacids that can be used herein to terminate the polyester chain, include linoleic acid, linolenic acid, geranic acid, dehydrogeranic acid, sorbic acid, heptatri-1,3,5-ene-1-carboxylic acid, nonatetra-1,3,5,7-ene-1-carboxylic acid, other fatty acids of vegetable oils, abietic acid, methacrylic acid, and, benzoic acid.

Examples of suitable diols useful herein include ethylene glycol, diethylene glycol, triethylene glycol, 1,2-propylene glycol, 1,3-propylene glycol, 1,4-dimethoxy cylcohexane, 1,2-butylene glycol, 1,3-butylene glycol, 1,4-butylene glycol, 1,2-cyclopentanediol, 1,3-cyclopentanediol, 1,4-cyclopentanediol, 1,2-cyclohexanediol, 1,3-cyclohexanediol, 1,4-cyclohexanediol, 1,4-cyclohexanedimethanol, 4,4'-methylene-bis(cyclohexanol), 4,4'-isopropylidene-bis(cyclohexanol), 1,3-bis(hydroxymethyl)cyclohexane, 1,3-bis(hydroxyethyl) cyclohexane, 1,3-bis(hydroxypropyl) cyclohexane, 1,3-bis(hydroxyisopropyl) cyclohexane, xylene glycol, bisphenol A, hydrogenated bisphenol A, bisphenol A/propylene oxide adducts, hydroquinone/propylene oxide adducts, hydroquinone/ethylene oxide adducts, neopentyl glycol, 1,6-hexanediol, 2,2,4-trimethyl-1,3-pentanediol, 1,3-isobutanediol, 1,2-isobutanediol, 2,3-butanediol, and 2-butenediol(1,4).

Examples of polyols having 3 or more hydroxyl functional groups that are useful herein in small amounts to form branched polyesters, include glycerol, trimethylolpropane, pentaerythritol, allyl ether polyols, polyalkylene glycol ethers, 1,1,1-trimethylol ethane, sorbitol, mannitol, diglycerol, and dipentaerythritol.

Instead of or in addition to the alcohol, epoxy compounds, such as ethylene oxide and propylene oxide, can be used.

Preparation of the unsaturated polyester can be carried out with standard techniques well known in the art. For instance, a two step process may be employed. In the first step, saturated or unsaturated glycols and acids are heated in the presence of an esterification catalyst, such as a tin catalyst, e.g., monobutyl tin oxide, stannous octoate, and monobutyl tin dilaurate, or acid catalyst, e.g., p-toluene sulfonic acid, methane sulfonic acid, and sulfuric acid, at about 400° F. to 480° F. for about 2 to 24 hours under nitrogen sparge and reacted to a given acid number or hydroxyl number while collecting water formed by esterification. The resultant esterified prepolymer is cooled to about 320° F. to 390° F. Glycol loss is measured by refractive index and the lost glycol is added, if needed. Then, in the second step, unsaturated or saturated glycols and acids are charged to the reaction vessel again under nitrogen sparge. The reaction mixture is heated to about 350° F. to 450° F. for about 2 to 8 hours and reacted to a given acid number, viscosity and amount of water, if appropriate. The resultant resin is then inhibited with hydroquinone or other substituted phenolic derivative inhibitor.

Unsaturated polyesters resins can also be prepared in a single step by heating saturated and unsaturated polycarboxylic acids with polyols and esterification catalyst, such as stannous oxide, under nitrogen sparge to about 320° F. to 480° F. for about 1 to 24 hours. The water of esterification is collected to measure the reaction. The glycol loss is again measured and glycol is added, if needed. The reaction is run to the appropriate acid or hydroxyl number and viscosity.

The unsaturated polyester resins can be crystalline, (semi) crystalline, or amorphous. Crystalline and (semi)crystalline unsaturated polyesters are generally preferred over amorphous unsaturated polyesters, since stable powder coatings with lower melt viscosity and better flow can be prepared more easily therefrom.

It is known in the art that certain monomers used in the polycondensation reactions impart crystallinity to the unsaturated polyesters. For example, dihydric alcohol monomers that are known to promote crystallinity include ethylene glycol, 1,4-butanediol, neopentyl glycol, and cyclohexanedimethanol. Dicarboxylic acid monomers that are known to promote crystallization include terephthalic acid and cyclohexane dicarboxylic acid.

The preferred unsaturated polyesters useful herein have a long shelf life without cold flow at temperatures substantially above room temperature up to about 120° F. and have a glass transition temperature ($T_g$) or melt temperature ($T_m$) below the desired flow temperature required for preservation of heat sensitive substrates, preferably between about 160° F. and about 250° F.

The preferred unsaturated polyesters have a molecular weight ranging between about 400 and about 10,000, more typically about 800 and about 6,800, and, preferably, between about 2,000 and about 4,500.

The unsaturated polyesters preferably have a degree of unsaturation between about 2 and about 20 wt. % unsaturation, and, preferably, between about 4 and about 10 wt. % unsaturation.

Whether the polyester is carboxylic acid-functionalized or hydroxyl-functionalized depends upon the —COOH/—OH molar ratio of the monomer mix. If the unsaturated polyester is hydroxyl-functionalized, then the hydroxyl number of the polyester is generally between about 5 and about 100, and, preferably, between about 9 and about 50. If the unsaturated polyester is acid-functionalized, then the acid number of the polyester is generally between about 1 and about 80, and, preferably, between about 9 and about 50.

Preferably, the unsaturated polyesters are solid resins at room temperature or above, so that they can be easily formulated into nonsintering powders. If the resins are liquids, they should be converted to powder form and, thus, be counted as a solid by absorption onto inert silica-type filler materials, such as fumed silica, before use, as is well known in the art.

Exemplary unsaturated polyester formulations useful herein are further specified in the working examples.

The unsaturated acrylate and methacrylate resins useful herein include polymers containing unreacted acrylate or methacrylate groups in the main chain or side chain. The unsaturated acrylate or methacrylate polymers are the reaction products of one or more solid functional polymers having reactive functional groups with one or more co-polymerizable monomers having co-reactive functional groups capable of reacting with the functional groups of the polymer, with at least one of the functional polymer or co-polymerizable monomer also containing an acrylate or methacrylate group available for final curing of the resin. The unsaturated acrylate or methacrylate polymer obtained in the aforesaid reaction may be an acrylated epoxy, acrylated urethane, acrylated polyether, or acrylated polyester resin, or their corresponding methacrylates.

The polymers containing unreacted acrylate or methacrylate groups in the side chains can prepared by standard techniques well known in the art. For instance, a two step process may be employed. In the first step, a solid functional polymer is formed using standard polymerization techniques. For example, the polymer formed in step one can be a functionalized acrylate or methacrylate polymer.

Suitable monomers which are commonly used to form the backbone of such functionalized acrylate and methacrylate polymers, include methyl acrylate, methyl methacrylate, ethyl acrylate, ethyl methacrylate, n-butyl acrylate, n-butyl methacrylate, isobutyl acrylate, isobutyl methacrylate, 2-ethylhexyl acrylate, 2-ethylhexyl methacrylate, and the like. In addition, suitable amounts of functional monomers are co-polymerized during polymerization to obtain the functionalized polymer. Acid-functional acrylate or methacrylate polymers can be formed from acid-functional monomers, such as acrylic acid and methacrylic acid. Hydroxyl-functional acrylate or methacrylate polymers can be formed from hydroxyl-functional monomers, such as 2-hydroxyethyl methacrylate, 2-hydroxypropyl methacrylate, 3-hydroxypropyl methacrylate, 3,4-dihydroxybutyl methacrylate. Epoxy-functional acrylate or methacrylate polymers can be formed from epoxy-functional monomers, such as glycidyl methacrylate, 2,3-epoxybutyl methacrylate, 3,4-epoxybutyl methacrylate, 2,3-epoxycyclohexyl methacrylate, and 10,11-epoxyundecyl methacrylate. Isocyanate-functional polymers can also be formed from isocyanate functional monomers, such as meta-isopropenyl-α,α-dimethylbenzylisocyanate (TMI).

The functional polymers formed in step one that will be reacted with bi-functional acrylate or methacrylate monomers can also be other types of solid resins, other than acrylates or methacrylates, having acid, hydroxyl, epoxy or isocyanate functional groups, for example, epoxidized bisphenol A resins or acid, hydroxyl, or isocyanate functionalized polyester resins.

In the second step, a reaction is carried out between the unreacted functional groups of the solid functional polymer formed in step one with a co-polymerizable monomer having both a co-reactive functional group capable of reacting with the reactive functional groups of the functional polymer and an unsaturated acrylate or methacrylate group available for final curing of the resin. Any one of the functionalized acrylate or methacrylate monomers listed above can serve as this bi-functional co-polymerizable monomer.

The reaction is carried out by dissolving the above formed solid functional polymer in an appropriate solvent for the polymer, such as butyl acetate, and then adding the bi-functional co-polymerizable monomer having pendent acrylate or methacrylate unsaturated groups in a stepwise manner at elevated temperatures between, for example about 150° F. and 300° F., until substantial completion of the reaction. This reaction can also be done without solvent by heating the reactants above their melting points. For example, in the second step an acid-functional acrylate or methacrylate polymer can be reacted with a compound having an epoxy group, such as an epoxy-containing acrylate or methacrylate monomer, e.g., glycidyl methacrylate, to form a methacrylated polyester. An isocyanate-functional polymer, e.g., TMI, can likewise be reacted with a hydroxy-functional acrylate or methacrylate monomer, such as 2-hydroxyethyl methacrylate, to form an acrylated urethane.

Resins containing acrylate or methacrylate groups in the main chain can be prepared by reacting epoxy-, carboxyl-, hydroxyl-, or isocyante-containing resins with bi-functional acrylate or methacrylate monomers having functional groups co-reactive with the aforesaid functionalities. For example, an epoxy-functional polymer, such as polyglycidyl methacrylate or epoxidized bisphenol A resin, can be reacted with a monomer having acid group, such as acrylic acid or methacrylic acid. In this reaction, the heat must be closely monitored to assure that the acrylic acid does not polymerize. In addition, an acid-functional polyester, such as one prepared from neopentyl glycol, ethylene glycol, adipic acid and isophthalic acid, can be reacted with a bi-functional acrylate or methacrylate compound having epoxy groups, such as glycidyl methacrylate. Also of note is the reaction of acrylic or methacrylic acid with an alcohol or hydroxyl functional polyester at elevated temperatures to form a polyester with acrylate functionality.

The unsaturated group left in the polymer for final curing of the powder coating need not be an acrylate or methacrylate group, although an unsaturated acrylate or methacrylate unsaturation is most preferred. It is also possible to form other solid resins having allyl, vinyl, vinyl ether, and styryl functionalities. For example, a hydroxyl functional polyester resin, such as one made with neopentyl glycol, 1,4-cyclohexane dimethanol, terephthalic acid and adipic acid, can be reacted with TMI, to form a styryl-functional resin.

The unsaturated acrylated or methacrylated polymer would be used similarly to the unsaturated polyester resin in this portion of the formulation. The $T_g$, molecular weight, and % unsaturation range would be similar to that used for the unsaturated polyesters. The % unsaturation in this case will be governed by the amount of acrylate or methacrylate in the polymer. Whereas the % unsaturation in the polyester is governed by the maleic or fumaric content of polyester.

The acrylate or methacrylate polymer resins are capable of crosslinking without an additional crosslinking agent, although crosslinkers may be used with such formulations.

Preferably, the unsaturated polyacrylate and polymethacrylate resins are solids at room temperature or above, so that they can be easily formulated into nonsintering powders. If the resins are liquids, they should be converted to powder form and, thus, be counted as a solid, by absorption onto inert silica-type filler materials, such as fumed silica, before use, as is well known in the art.

Exemplary unsaturated acrylate or methacrylate polymer formulations useful herein are further specified in the working examples.

Crosslinkers

The unsaturated polyester resins useful herein work best in combination with co-polymerizable second resins having ethylenic unsaturation and preferably having two sites of unsaturation per molecule. These second resins are used in the composition as crosslinkers for the base resin. Most preferred is a predominance of monomers or prepolymers that are solid at room temperature or above, so that they can be easily formulated into nonsintering powders.

The co-polymerizable second resins or crosslinkers useful herein are preferably oligomers or polymers having vinyl ether, acrylate or methacrylate, or allyl ester groups, with an oligomer or polymer having vinyl ether groups being most preferred.

The co-polymerizable second resins having vinyl ether groups are preferably composed of vinyl ether functionalized urethanes, for example, a divinyl ether urethane based on the reaction product of a diisocyanate, such as hexamethylene diisocyanate, and a hydroxyl-functional vinyl ether, such as hydroxybutyl vinyl ether. Other suitable hydroxyl-functional vinyl ethers include hydroxyethyl vinyl ether and trimethylene glycol monovinyl ether. Other suitable diisocyanates include isophorone diisocyanate, methylene diisocyanate, methylenebiscyclohexylisocyanate, trimethyl-hexamethylene diisocyanate, hexane diisocyanate, hexamethyl diisocyanate, hexamethylamine diisocyanate, methylenebiscyclohexyl isocyanate, toluene diisocyanate, 1,2-diphenylethane diisocyanate, 1,3-diphenylpropane diisocyanate, diphenylmethane diisocyante, dicyclohexylmethyl diiscoyanate, and other isocyanate prepolymers and terpolymers. Functional prepolymers derived from these diisocyanates, such as urethane trimers, uretdiones, isocyanurates, and biurets can also be used.

The functionalized vinyl ethers can be obtained in a conventional manner. For example, vinyl ether urethanes are usually prepared by reacting a hydroxyl-functional vinyl ether with a multi-functional isocyanate-containing monomer or polymer in solvent, such as methylene chloride, under a nitrogen atmosphere, at temperatures between about ambient and 125° C. Additional reference can be made to U.S. Pat. No. 4,751,273 to Lapin et al. for the preparation of vinyl ether functionalized urethanes, which disclosure is incorporated by reference herein in its entirety. Examples of vinyl ether urethanes are sold under the trade names Uralac resins by DSM Resins and Vectomer Oligomers and Diluents by Allied Signal.

The co-polymerizable second resins having acrylate or methacrylate groups are preferably composed of dimethacrylate functionalized urethanes, for example, based on diisocyanate, such as hexanediisocyanate, and a hydroxyl-functional methacrylate, such as hydroxyethyl methacrylate. Other isocyantes can be used as well such as those listed above. In addition, other suitable hydroxyl-functional methacrylates include hydoxypropyl methacrylate and other hydroxy alkyl methacrylates. This material can be reacted the same as the vinyl ethers above.

The co-polymerizable second resins having allyl ester groups are preferably composed of hydroxy functional allyl esters, for example, based on the esterification reaction product of allyl alcohol and phthalic anhydride, which forms diallyl phthalate. Examples of suitable allyl functionalized oligomers, include diallyl phthalate prepolymers, iso-diallyl phthalate prepolymers, p-diallyl phthalate prepolymers, diallyl maleate, triallyl cyanurate, diallyl chlorendate methacrylamide, and triallylisocyanurate.

If the co-polymerizable second resin is a liquid or a sticky powder and is used in sufficient quantities that the resultant melt blended powder coating composition is not adequately free flowing, then this coreactant can be absorbed on an inert filler, such as fumed silica, and thus be counted as a solid within the preferred scope of this invention. Except in small quantities up to about 5 wt. % of the powder coating composition, these liquids species are much less preferred than solid co-reactants due to sintering problems.

The relative amounts of unsaturated polymer base resin to unsaturated copolymerizable second resin provided in the powder coating compositions of this invention depend in part on the choice of materials. For instance, when the resin is an unsaturated polyester and the second resin crosslinker is a vinyl ether functionalized compound, the equivalent ratio of polyester unsaturation to vinyl ether unsaturation is between about 90:10 and about 10:90, and, preferably about 50:50. When the resin is an unsaturated polyester and the second resin crosslinker is an allyl ester functionalized compound, the equivalent ratio of polyester unsaturation to allyl ester unsaturation is between about 99:1 and about 1:99, and, preferably, between about 70:30 and about 95:5. When the resin is a acrylate or methacrylate polymer, it is preferred to not use a crosslinker.

Exemplary crosslinker formulations useful herein are further specified in the working examples.

UV Photoinitiators

UV photoinitiators that are incorporated in the powder coating compositions to impart a radiation activated, rapid, and low temperature cure to the powder are well known in the art. Examples of suitable photoinitiators, which are known as alpha cleavage free radical photoinitiators, include benzoin and its derivatives, for example, benzoin ethers, such as isobutyl benzoin ether and benzyl ketals, such as benzyl dimethyl ketal, 2-hydroxy-2-methyl-1-phenylpropan-1-one and 4-(2-hydroxyethoxy) phenyl-2-hydroxy-2-propyl ketone. Others include acyl phosphines, such as 2,4,6-trimethylbenzoyl diphenylphosphine oxide. Aryl ketones can also be used, such as 1-hydroxycyclohexyl phenyl ketone, 2-benzyl-2-dimethylamino-1-(4-morpholinophenyl)-butan-1-one, 2,2-dimethoxy-2-phenylaceto-phenone, mixture of benzophenone and 1-hydroxycyclohexyl phenyl ketone, perfluorinated diphenyl titanocene, and 2-methyl-1-(4-(methylthiophenyl)-2-(4-morpholinyl))-1-propanone.

Hydrogen abstraction free radical type photoinitiators can be used in combination with the above or alone such as Michler's ketone (4,4'-bisdimethylamino benzophenone), Michler's ethyl ketone (4,4'-bisdiethylamino benzophenone ethyl ketone), benzophenone, thioxanthone, anthroquinone, d,l-camphorquinone, ethyl d,l-camphorquinone, ketocoumarin, anthracene, or derivatives thereof, and the like.

Cationic polymerization, especially with vinyl ether containing crosslinkers, can proceed via cationic cure using cationic photoinitiators. Major classes of cationic photoinitiators are diaryliodonium salts and copper synergists, such as diphenyl iodonium hexafluorophosphate, dibenzyl iodonium hexaflouroarsinate and copper acetate, triarylsulfonium salts, such as triphenyl sulphonium hexafluorophosphate, triphenyl sulphonium tertafluoroborate. Dialkylphenacylsulfonium salts, ferrocenium salts, such as cyclopentadienyl iron(II) hexafluorophosphate, alphasulfonyloxy ketone, and silyl benzyl ethers can be used as well.

Preferably, the photoinitiators used herein are solids. If liquid initiators are used, however, preferably they are absorbed on solid carriers, such as fumed silica, prior to incorporation in the powder coating compositions of this invention.

In general, the amount of photoinitiator used in the powder coating composition of the present invention ranges between about 0.1 and 10 parts per hundred resin (phr), and preferably between about 1 and 5 phr.

Exemplary photoinitiator formulations useful herein are further specified in the working example.

Reference can also be made to EP 0 636 669 A2 to DSM, N.V. for further examples of the aforementioned base resins, crosslinkers, and photoinititiators, which disclosure is incorporated by reference herein in its entirety.

Thermal Initiators

The thermal initiators useful in the powder coating compositions of this invention are free radical generating compounds, preferably peroxides and azo initiators. Examples of suitable peroxide initiators, include diacyl peroxides, such as 2-4-diclorobenzyl peroxide, diisononanoyl peroxide, decanoyl peroxide, lauroyl peroxide, succinic acid peroxide, acetyl peroxide, benzoyl peroxide, and diisobutyryl peroxide, acetyl alkylsulfonyl peroxides, such as acetyl cyclohexylsulfonyl peroxide, dialkyl peroxydicarbonates, such as di(n-propyl)peroxy dicarbonate, di(sec-butyl)peroxy dicarbonate, di(2-ethylhexyl)peroxy dicarbonate, diisopropylperoxy dicarbonate, and dicyclohexylperoxy dicarbonate, peroxy esters, such as alpha-cumylperoxy neodecanoate, alpha-cumylperoxy pivalate, t-amyl neodecanoate, t-amylperoxy neodecanoate, t-butylperoxy neodecanoate, t-amylperoxy pivalate, t-butylperoxy pivalate, 2,5-dimethyl-2,5-di(2-ethylhexanoylperoxy)hexane, t-amylperoxy-2-ethyl hexanoate, t-butylperoxy-2-ethyl hexanoate, and t-butylperoxy isobutyrate, azobis (alkyl nitrile) peroxy compounds, such as 2,2'-azobis-(2,4-dimethylvaleronitrile), azobisisobutyronitrile, and 2,2'-azobis-(2-methylbutyronitrile); t-butyl-peroxymaleic acid, 1,1'-azobis-(1-cyclohexanecarbonitrile).

Other thermal initiators, include peroxy ketals, such as 1,1-di(t-butylperoxy)-3,3,5-trimethylcyclohexane, peroxy esters, such as o,o'-t-butyl-o-isopropyl monoperoxy carbonate, 2,5-dimethyl-2,5-di(benzoylperoxy) carbonate, o,o'-t-butyl-o-(2-ethylhexyl)-monoperoxy carbonate, t-butylperoxy acetate, t-butylperoxy benzoate, di-t-butyldiperoxy azelate, and di-t-butyldiperoxy phthalate, dialkylperoxides, such as dicumyl peroxide, 2,5-dimethyl-2,5-di(t-butylperoxy)hexane, t-butyl cumyl peroxide, di-t-butyl peroxide, and 2,5-dimethyl,2,5-di(t-butylperoxy) hexyne-3, hydroperoxides, such as 2,5-dihydroperoxy-2,5-dimethyl hexane, cumene hydroperoxide, t-butyl hydroperoxide and t-amyl hydroperoxide, ketone peroxides, such as n-butyl-4,4-bis-(t-butylperoxy)valerate, 1,1-di(t-butylperoxy)-3,3,5-trimethyl cyclohexane, 1,1'-di-t-amyl-peroxy cyclohexane, 2,2-di(t-butylperoxy) butane, ethyl-3, 3-di(t-butylperoxy)butyrate, and blend of t-butyl peroctoate, and 1,1-di(t-butylperoxy)cyclohexane.

Also included are o,o'-t-alkyl-o-alkylmonoperoxy carbonates, such as o,o'-t-butyl-o-isopropylmonoperoxy carbonate, p,p'oxybis(benzene sulfonyl) hydrazide, and accelerated azocarbonamide.

Preferably, the thermal initiators used herein are solids. If liquid initiators are used, however, preferably they are absorbed on solid carriers, such as fumed silica, prior to incorporation in the powder coating compositions of this invention.

In general, the amount of thermal initiator used in the powder coating composition of the present invention ranges between about 0.1 and about 10 phr, and, preferably, between about 1 and about 6 phr.

Exemplary thermal initiator formulations useful herein are further specified in the working examples

Opacifiers

The powder coating compositions of this invention can be opacified or pigmented without diminishing the through cure properties. Examples of suitable pigments useful herein, include carbon black, Shepard black No. 1, titanium dioxide white, chromium oxide green, zinc oxide, iron oxide yellows, reds, browns and blacks, such as ferrite yellow oxide, ferric oxides, raw sienna and burnt sienna, lead chromate, copper phthalonitrile blue, phthalocyanine blues and greens, ultramarine blue, toluidine red, parachlor red, cadmium reds and yellows, phthaloorganamine blues and greens, iron blues, organic maroons, and the like. Especially useful are lower reflecting pigments such as anatase titanium dioxide, zinc sulfide, and the mixed metal oxide pigments, such as manganese ferrite black, chromium green black hematite, cobalt aluminate blue spinel, copper chromite black spinel, and sodium alumina sulfosilicate. Also possible with this technology are metallics made with aluminum, mica, or brass.

Fillers may also be used to opacify or lower the gloss of the powder coating without diminishing the through cure properties. Examples of suitable fillers useful herein, include silica, such as fumed silica, glass flit, flour, calcium carbonate, barium sulfate, mica, ammonium chloride, ammonium bromide, boric acid, antimony trioxide, fumed alumina, clays such as kaolin, china clay, talc, lithopone, zinc sulfide, lead titanate, zirconium oxide, white lead, barium oxide, calcium oxide or hydroxide, magnesium oxide or hydroxide, chalk, asbestos, ceramic, hollow glass, resin microspheres, pearl essence, barytes, diatomaceous earth, aluminum trihydrate, onyx flour, calcium silicate, mixed silicates, and the like.

In general, the amount of pigments, fillers and opacifiers used in the powder coating composition of the present invention ranges between about 0.1 and about 100 phr, and, preferably, between about 1 and 60 phr. However, loadings can vary depending on the desired opacity of the dry film.

Other Ingredients

In addition to the aforementioned components, the powder coating composition of this invention may also contain conventional powder coating additives, such as gloss control aids, powder flow aids, leveling agents, dispersants, anticratering agents, stabilizers and other standard materials.

Gloss control agents such as polyethylene waxes, oxidized polyethylenes, polyamides, teflons, polyamides may be used in a formulation to adjust or obtain a lower gloss coating.

Preferred powder flow aids that may be employed in the powder coating of this invention are acrylic or silicone flow aids, which are composed of acrylic or silicone resins, respectively. The acrylic resins are generally liquids which have been converted to powder form by absorption onto silica-type materials. An example of an acrylic flow aid is sold under the trade name Resiflow P67 by Estron Chemical, which is a 2-propenoic acid, ethyl ester polymer. Examples of other suitable acrylic flow aids are acrylic resins sold under the trade name BYK 352 and BYK 300 by BYK Chemie. When used, the powder flow aid is generally provided in an amount between about 0.1 and about 6 phr, and, preferably, between about 0.7 and about 1.5 phr, in the thermosetting powder coating compositions of this invention.

Dry flow additives are normally employed, such as fumed silica or alumina oxide, to reduce the tendency to cake or block during transportation or use. An example of a fumed silica is sold under the trade name Cab-O-Sil by Cabot Corporation. An example or an aluminum oxide is sold under the trade name Aluminum Oxide C by Degussa Corporation. When used, the dry flow additive is generally provided in an amount between about 0.05 and about 0.5 phr, and, preferably, between about 0.1 and about 0.3 phr.

Outgassing or anticratering aids can be used in these formulations to reduce or eliminate bubbles or trapped gas from the substrate or coating. Typical outgassing aids include, benzoin (2-hydroxy-1,2-diphenylethanone) and its analogs, and plasticizers, such as low molecular weight phenoxies and phthalates. When used, the outgassing aid is generally provided in an amount between about 0.1 and about 15 phr, and, preferably, between about 1 and about 5 phr.

UV stabilizers are also commonly used to improve weathering, such as UV absorbers and hindered amine- or hindered phenol-like stabilizers. When used, the UV stabilizers are generally provided in an amount between about 0.1 and about 5 phr, and, preferably, between about 1 and about 3 phr.

Powder Preparation

The powder coatings of this invention are prepared by conventional techniques employed in the powder coatings art. Typically, the components of the powder coating formulation are thoroughly blended together by medium to high intensity mixing until the mixture is homogeneous and dry, and then melt blended, preferably in an extruder. Any ingredients which are liquid at the mixing temperature can optionally be absorbed onto a dry substrate which may constitute one of the other ingredients of the mixture. Melt blending is generally carried out in the temperature range of between about 160° F. and about 300° F., and, preferably, between about 180° F. and about 250° F., with careful control of the extruder temperature to minimize any curing and gelation from taking place in the extruder. The extruded composition, usually in sheet form after cooling substantially to room temperature, is broken into chips and then ground in a mill to a powder, while carefully controlling the temperature between about −160° F. (cryogenic) and about 90° F., and, preferably, between about 0° F. and about 75° F., and then subsequently screened to achieve the desired powder particle size, typically having an average particle size of about 30 microns.

The prepared powder coatings of this invention exhibit the following properties: long shelf life at temperatures preferably up to about 90° F.; ability to flow out at relatively low temperatures preferably between about 160° F. and about 250° F.; relatively low flow viscosity; ability to be fully cured throughout, especially at the lower layers near the substrate, despite the presence of opaque pigments or thick films, ability to form exceptionally smooth films having the desired glossiness despite the presence of a thermal initiator; rapid cure; together with desirable other properties, such as good flexibility, adhesion, hardness, scratch resistance, etc.

Coating Method

First, the powder coatings of this invention are applied in dry, free flowing, solid powder form over the substrate to be coated. Preferably, powders are sprayed onto the substrate by well known electrostatic powder spray techniques, such as corona discharge or triboelectric electrostatic spray techniques.

Next, the powders are exposed to only enough heat to melt, level and flow out the powders into a continuous molten film having the desired smoothness, and activate the thermal component of the cure. Heating may take place in either infrared (IR) or convection ovens, or a combination of both.

The applied powders of this invention become molten at sufficiently low temperatures and form smooth films at very rapid speeds, so as not to cause damage to a heat sensitive substrate. The powder flow temperature is relatively low, preferably between about 160° F. and about 250° F., and it preferably takes only between about 5 and about 190 seconds for the powder to adequately flow out as a smooth, continuous, uniform, molten film over the substrate. The flow viscosity is also sufficiently low, for example, between about 100 and 4,000 cone and plate, which allows the powder to have good flow out behavior on heating to result in smooth coatings. Sufficient outgassing of substrate volatiles simultaneously occurs during the flow out step to eliminate surface defects, such as blisters and pin holes.

While the powder coatings are molten, the films are exposed to a UV light source, such as medium pressure mercury vapor lamps or gallium lamps, for example, Fusion H-, D- and/or V-lamps, to activate the ultraviolet component of the cure and to rapidly cure the films into smooth hardened finishes. Electron beam radiation can be used as well.

Upon exposure to UV radiation, the molten films are rapidly hardened between about 1 millisecond and about 10 seconds, and, preferably, less than about 3 seconds. The hardened dry film finishes formed on the substrate preferably have a thickness of between about 0.5 and about 25 mils, and, more preferably, between about 1 and about 10 mils. UV hardened thicker films, e.g., more than 2 mils, can be formed with a single coat which has not heretofore been possible.

Thick films and pigmented films can be essentially fully cured as well as thin and clear films using the powder coatings of this invention, resulting from the presence of a thermal initiator in the coating.

Despite the presence of the thermal initiator, the hardened film finishes produced from the powder coatings of this invention surprisingly have substantially the same exceptional smoothness as that of standard UV curable powder coatings. The powder coating film finish gives off the appearance of being a plastic coating or laminate.

The surprising finding is that the thermal initiator, such as a peroxide, improves through cure and adhesion to the substrate without impairing the flow out behavior and without detracting from the smoothness and desired glossiness of the cured film.

The powder coatings of the present invention are found to be particularly useful when applied to heat sensitive substrates, such as wood, wood composites, and plastic, due to the low temperature and rapid cure aspects of these coatings. Using the aforesaid heating and UV curing techniques, it is possible to limit the thermal load on the substrate to acceptable levels for heat sensitive substrates, so as not to cause embrittlement, loss of integrity, deformation, and other damage to the physical and/or chemical properties of the heat sensitive substrates.

However, it should be understood that the invention is not limited to heat sensitive substrates, and the powder coatings of this invention can form the same smooth hardened film finishes on heat resistant substrates, such as metal, as well. Exemplary substrates that can be coated with the powder coatings of this invention are listed hereinbelow.

Heat Sensitive Substrates

Examples of suitable heat sensitive substrates useful herein, include wood, such as hardwood, hard board, laminated bamboo, wood composites, such as particle board, electrically conductive particle board, fiber board, medium density fiber board, masonite board, laminated bamboo, and other substrates that contain a significant amount of wood. Any of these wood based substrates may be filled or primed with materials, such as UV liquids, powder primers, or solvent or waterborne coatings to improve smoothness and reduce film builds. The wood substrates are typically used in kitchen cabinetry, shelving and storage units, home and business furniture, computer furniture, etc.

Other heat sensitive substrates are plastics, such as ABS, PPO, SMC, polyolefins, acrylics, nylons and other copolymers which usually will warp or outgas when coated and heated with traditional heat curable powders. The plastics are typically used in automotive parts. Still other heat sensitive substrates include paper, cardboard, and composites and components with a heat sensitive aspect, and the like.

Heat Resistant Substrates

Examples of suitable heat resistant substrates, include metal, such as steel and other alloys, which are typically used for building panels, rebars, pipelines, cold coil springs, and steel strapping. Other heat resistant substrates, include glass, ceramic for ceramic tiles, carbon and graphite.

The invention will be further clarified by a consideration of the following specific examples which are intended to be purely exemplary of the invention.

EXAMPLE 1

Preparation of Pigmented Polyester/Vinyl Ether Powder Coating With Dual Thermal and UV Cure The ingredients listed below in Table 1 were compounded as described to form a pigmented powder coating of this invention having a dual cure, thermal and UV, aspect.

COMPARATIVE EXAMPLE 1

Preparation of Pigmented Polyester/Vinyl Ether Powder Coating With UV Cure Only

The ingredients listed below in Table 1 were compounded as described to form a pigmented powder coating having a UV cure aspect only.

TABLE 1

| Ingredients | Phr | |
|---|---|---|
| | Ex. 1 | Comp. Ex. 1 |
| DRY BLEND UNTIL HOMOGENEOUS | | |
| XP 3125 Unsaturated Polyester[1] | 80 | 80 |
| ZW 3307 Vinyl Ether[2] | 20 | 20 |
| Lucerin TPO Photoinitiator[3] | 2 | 2 |
| Irgacure 184 Photoinitiator[4] | 1 | 1 |
| Resiflow P67 Acrylic Flow Aid[5] | 1.5 | 1.5 |
| Lupersol 230XL Peroxide[6] | 2 | 0 |
| TiPure R-902 Titanium Dioxide[7] | 25 | 25 |
| Total | 131.5 | 129.5 |

CHARGE TO EXTRUDER AND EXTRUDE TO SHEETS
MELT TEMPERATURE = 200° F.
AIR COOL AND BREAK INTO CHIPS
CHARGE TO MILL AND GRIND TO POWDER AT HIGH SPEED
SCREEN TO -140 MESH

[1]XP 3125 Unsaturated Polyester is a solid, acid-functional, semicrystalline polyester resin that is believed to be derived from fumaric acid, terephthalic acid, and 1,6-hexanediol, and that is commercially available from DSM Resins.
[2]ZW 3307 Vinyl Ether is a solid, divinyl ether functionalized urethane crosslinker resin that is believed to be derived from derived from hexamethylene diisocyante and 4-hydroxybutyl vinyl ether, and that is commercially available from DSM Resins.
[3]Lucerin TPO Photoinitiator is a 2,4,6-trimethylbenzoyldiphenyl phosphine oxide that is commercially available from BASF.
[4]Irgacure 184 Photoinitiator is an aryl ketone, 1-hydroxycyclohexyl phenyl ketone, that is commercially available from Ciba Additives.
[5]Resiflow P67 Acrylic Flow Aid is a polyacrylate, which is a 2-propenoic acid ethyl ester polymer that is commercially available from Estron Chemical.
[6]Lupersol 230XL Peroxide is a peroxy ketal, 1,1bis(t-butylperoxy)3,3,5-trimethylcyclohexane on an inert filler at 40% active ingredient that is commercially available from Elf Atochem.
[7]TiPure R-902 is a white titanium dioxide pigment that is commercially available from Du Pont.

Results

The powder coating compositions listed in Table 1 were electrostatically sprayed with a tribo gun to about 3 to 6 mils on respective ½" particle boards. The boards were heated with quartz IR lamps for about 30 sec. to about 250° F. in order to form a molten film. Next, the boards were immediately conveyed through a UV source and cured by exposure to UV radiation, first with a V-lamp and then with a H-lamp, at about 30 ft./min. for about one second. The cured powder coatings were then subject to performance tests with the test results listed below in Table 2.

TABLE 2

| | Result | |
|---|---|---|
| Test | Ex. 1 | Comp. Ex. 1 |
| Cross Hatch Adhesion | 3B/4B | 0B/1B |
| Appearance | Moderate Orange Peel | Moderate Orange Peel |
| Outgassing | None | Slight |
| Solvent Resistance (50 Double Rubs) | No Effect | No Effect |
| Pencil Hardness Mar | 3H | F |

EXAMPLE 2
Preparation of Pigmented Polyester/Allyl Ester Powder Coating With Dual Thermal and UV Cure The ingredients listed below in Table 3 were compounded as described to form a pigmented powder coating of this invention having a dual cure, thermal and UV, aspect.

COMPARATIVE EXAMPLE 2
Preparation of Pigmented Polyester/Allyl Ester UV Curable Powder Coating With Peroxide Cure Only The ingredients listed below in Table 3 were compounded as described to form a pigmented powder coating having a thermal peroxide cure aspect only.

TABLE 3

| Ingredients | Phr | |
|---|---|---|
| | Ex. 2 | Comp. Ex. 2 |
| DRY BLEND UNTIL HOMOGENEOUS | | |
| Pioester 275 Unsaturated Polyester[1] | 80 | 80 |
| Iso Diallyl Phthalate[2] | 20 | 20 |
| Resiflow P67 Acrylic Flow Aid | 1.5 | 1.5 |
| Benzoin[3] | 0.8 | 0.8 |
| Lupersol 231 Peroxide[4] | 3 | 3 |
| Benzyl Dimethyl Ketal Photoinitiator[5] | 2 | 0 |
| TiPure R-902 Titanium Dioxide | 20 | 20 |
| Total | 127.3 | 125.3 |

CHARGE TO EXTRUDER AND EXTRUDE TO SHEETS
MELT TEMPERATURE = 180° F.
AIR COOL AND BREAK INTO CHIPS
CHARGE TO MILL AND GRIND TO POWDER AT HIGH SPEED
SCREEN TO -140 MESH

[1]Pioester 275 Unsaturated Polyester is a solid, acid-functional, semicrystalline unsaturated polyester resin that is derived from maleic anhydride with 7% unsaturation and an acid number of 35, and that is commercially available from Pioneer Plastics.
[2]ISO Diallyl Phthalate is an allyl ester functional crosslinking agent that is commercially available from GCA Chemical.
[3]Benzoin is a degasssing and anti-cratering agent that is commercially available from Estron Chemicals.
[4]Lupersol 231 Peroxide is a peroxy ketal, 1,1-bis(t-butylperoxy)3,3,5-trimethylcyclohexane, that is commercially available from Estron Chemicals.
[5]Benzyl Ketal Dimethyl Ketal Photoinitiator is a benzyl ketal UV initiator that is commercially available from Ciba Additives.

Results

The powder-coating compositions listed in Table 3 were electrostatically sprayed with a tribo gun on respective ½" medium density fiber boards preheated using infrared lamps to about 200° F. to 250° F. The boards were post heated with quartz IR lamps for about 30 sec. to about 300° F. in order to form a molten film. Next the boards were immediately cured by exposure to UV radiation, first with a V-lamp and then with a H-lamp, at about 30 ft./min. for about one second. The cured powder coatings on particle board were subject to performance tests with the test results listed below in Table 4.

TABLE 4

| | Result | |
|---|---|---|
| Test | Ex. 2 | Comp. Ex. 2 |
| Cross Hatch Adhesion | 5B | 5B |
| Appearance | Moderate Orange Peel | Moderate Orange Peel |
| MEK Resistance (50 Double Rubs) | 5 No Effect | 3 Moderate Rub Off |
| Pencil Hardness Mar | H | H |

EXAMPLE 3
Preparation of Pigmented Acrylated Epoxy Powder Coating With Dual Thermal and UV Cure The ingredients listed below in Table 5 were compounded as described to form a pigmented powder coating of this invention having a dual cure, thermal and UV, aspect.

COMPARATIVE EXAMPLE 3
Preparation of Pigmented Acrylated Epoxy Powder Coating With Peroxide Cure Only The ingredients listed below in Table 5 were compounded as described to form a pigmented powder coating having a thermal peroxide cure aspect only.

TABLE 5

| | Phr | |
|---|---|---|
| Ingredients | Ex. 3 | Comp. Ex. 3 |
| DRY BLEND UNTIL HOMOGENEOUS | | |
| Pro 1723 Unsaturated Polyacrylate[1] | 100 | 100 |
| Lupersol 231XL Peroxide | 5.0 | 5.0 |
| TiPure R-960 Titanium Dioxide | 20 | 20 |
| Resiflow P67 Acrylic Flow Aid | 1.4 | 1.4 |
| Benzoin | 0.8 | 0.8 |
| Benzyl Dimethyl Ketal Photoinitiator | 2.0 | 0 |
| Total | 129.2 | 127.2 |
| CHARGE TO EXTRUDER AND EXTRUDE TO SHEETS | | |
| MELT TEMPERATURE = 180° F. | | |
| AIR COOL AND BREAK INTO CHIPS | | |
| CHARGE TO MILL AND GRIND TO POWDER AT HIGH SPEED | | |
| SCREEN TO –140 MESH | | |

[1]Pro 1723 Polyacrlyate is a solid epoxy acrylate resin that is available.

Results

The powder coating compositions listed in Table 5 were electrostatically sprayed with a tribo gun on respective ½" medium density fiber boards preheated using infrared lamps to about 200° F. to 250° F. The coated boards were post heated with quartz IR lamps for about 40 seconds in order to form a molten film. These boards were then cured immediately by exposure to UV radiation, first with a V-lamp and then with a H-lamp at 30 ft./min. for about one second. The cured powder coatings on particle board were subject to performance tests with the test results listed below in Table 6.

TABLE 6

| | Result | |
|---|---|---|
| Test | Ex. 3 | Comp. Ex. 3 |
| Cross Hatch Adhesion | 4B | 3B |
| Appearance | Slight Orange Peel | Slight Orange Peel |
| MEK Resistance | 5 | 2 |
| (50 Double Rubs) | No Effect | Heavy Rub Off |
| Pencil Hardness Mar | H | B |

The invention having been disclosed in the foregoing embodiments and examples, other embodiments of the invention will be apparent to persons skilled in the art. The invention is not intended to be limited to the embodiments and examples, which are considered to be exemplary only. Accordingly, reference should be made to the appended claims to assess the true spirit and scope of the invention, in which exclusive rights are claimed.

What is claimed is:

1. A dual thermal and radiation curable powder coating composition, which is a composition in particulate form that consists essentially of a melt blend of:

a) an ethylenically unsaturated base resin selected from unsaturated polyesters, unsaturated polyacrylates, unsaturated polymethacrylates, and mixtures thereof;

b) a second resin co-polymerizable with said base resin having an ethylenically unsaturated functional group selected from vinyl ether, acrylate, methacrylate, and allyl ester groups, and mixtures thereof;

c) a photoinitiator effective to enable radiation curing of the ethylenically unsaturated resins a) and b); and, d) a thermal initiator effective to enable thermal curing of the ethylenically unsaturated resins a) and b) while not causing substantial curing during melt blending, such that said composition is capable of being effectively flowed out, as it is melted for curing, at low flow temperatures at or below about 250° F. and is capable of being effectively cured, both on the surface and through, using heat and either ultraviolet or electron beam radiation.

2. The composition of claim 1, which further comprises:

e) an opacifier.

3. The composition of claim 2, in which:

said opacifier is selected from pigments, fillers, and mixtures thereof.

4. The composition of claim 2, in which:

said unsaturated resin is an unsaturated polyester derived from maleic or fumaric acid, or anhydrides thereof.

5. The composition of claim 2, in which:

said unsaturated resin is an unsaturated polyacrylate or polymethacrylate having, respectively, at least one acrylate or methacrylate group.

6. The composition of claim 2, in which:

said second co-polymerizable resin is a vinyl ether functionalized urethane prepolymer.

7. The composition of claim 2, in which:

said second co-polymerizable resin is an allyl ester prepolymer.

8. The composition of claim 2, in which:

said photoinitiator is a photolytically activated free radical generating compound.

9. The composition of claim 2, in which:

said thermal initiator is a thermally activated free radical generating compound.

10. The composition of claim 9, in which:

said thermal initiator is selected from peroxides and azo compounds.

11. The composition of claim 2, in which:

said composition is essentially fully curable, both on the surface and throughout, upon exposure to sufficient heat to melt and flow out said powder composition to a smooth molten film and activate the thermal component of the cure, followed by exposure of the molten film to sufficient UV radiation to activate the ultraviolet component of the cure and form a fully cured hardened film.

12. A wood, paper or plastic substrate having the powder coating of claim 2 coated and cured thereon.

13. An opaquely pigmented dual thermal and radiation curable powder coating composition, which is a composition in particulate form that consists essentially of a melt blend of:

a) an ethylenically unsaturated base resin selected from unsaturated polyesters;

b) a second resin co-polymerizable with said base resin having ethylenically unsaturated functional groups selected from vinyl ether, acrylate, methacrylate, and allyl ester groups, and mixtures thereof;

c) between about 0.1 and 10 phr of a photoinitiator selected from a photolytically activated free radical generating compound effective to enable radiation curing of the composition through the ethylenically unsaturated groups of resins a) and b);

d) between about 0.1 and 10 phr of a thermal initiator selected from a thermally activated free radical generating compound effective to enable thermal curing of the composition through the ethylenically unsaturated groups of resins a) and b) while not causing substantial curing during melt blending; and, e) between about 1 and 100 phr of an opacifier selected from pigments, fillers, and mixtures thereof, such that said composition is suitably flowable at low temperatures between about 160° F. and about 250° F. and is essentially fully curable, both on the surface and throughout, using thermal and either ultraviolet or electron beam radiation.

14. The composition of claim 13, in which said thermal initiator is selected from peroxides and azo compounds.

15. The composition of claim 13, in which said unsaturated resin is an unsaturated polyester containing at least one maleate or fumarate group.

16. The composition of claim 13, in which said second co-polymerizable resin is a vinyl ether functionalized urethane prepolymer.

17. The composition of claim 13, in which said second co-polymerizable resin is an allyl functionalized ester prepolymer.

18. The composition of claim 13, in which:

said unsaturated resin is an unsaturated polyester having a maleate or fumarate group;

said second co-polymerizable resin is a divinyl ether functionalized urethane prepolymer;

said thermal initiator is a peroxy ketal; and, said photoinitiator is a blend of an aryl ketone and an acyl phosphine.

19. The composition of claim 13, in which:

said unsaturated resin is an unsaturated polyester derived from maleic anhydride;

said second co-polymerizable resin is a diallyl ester prepolymer derived from isophthalic acid and allyl alcohol;

said thermal initiator is a peroxy ketal; and, said photoinitiator is a benzyl ketal.

20. A wood, paper or plastic substrate having the powder coating of claim 13 coated and cured thereon.

21. A method for producing a fully cured opaquely pigmented coating film on a substrate using an ultraviolet radiation curable powder coating, which comprises:

a) applying an opaquely pigmented powder coating over a substrate, said powder coating being in particulate form consisting essentially of a blend of;

i) an ethylenically unsaturated base resin selected from unsaturated polyesters, unsaturated polyacrylates, unsaturated polymethacrylates, and mixtures thereof, ii) optional second resin co-polymerizable with said base resin having ethylenically unsaturated functional groups selected from vinyl ether, acrylate, methacrylate, and allyl ester groups, and mixtures thereof, iii) a photoinitiator effective to enable radiation curing of the composition through the ethylenically unsaturated groups of resins a) and b), iv) a thermal initiator sufficient to enable thermal curing of the composition through the ethylenically unsaturated groups of resins a) and b) without causing said blend to pre-react upon being melt processed, and v) an opacifier selected from pigments, fillers, and mixtures thereof, such that said composition is suitably flowable at low temperatures between about 160° F. and about 250° F. and is essentially fully curable, both on the surface and throughout, using heat and ultraviolet radiation;

b) applying just enough heat to said coating to melt and flow out said coating into a smooth molten film and activate the thermal component of the cure; and, c) applying an effective amount of ultraviolet radiation to said molten film to activate the ultraviolet component of the cure and form a fully cured, both on the surface and throughout, hardened film finish.

22. The method of claim 21, in which said fully cured, UV hardened film finish has a dry film thickness between about 0.5 mils and about 25 mils formed in a single coat.

23. The method of claim 21, in which:

said substrate is a heat sensitive substrate.

24. The method of claim 23, in which:

said heat sensitive substrate is a wood substrate.

25. A wood, paper or plastic substrate coated with a powder coating according to the method of claim 21.

26. The method of claim 21, in which:

said powder coating in step a) is applied electrostatically.

27. A dual thermal and radiation curable powder coating composition, which is a composition in particulate form that comprises a film-forming blend of:

a) an ethylenically unsaturated base resin;

b) a second ethylenically unsaturated co-polymerizable resin;

c) a photoinitiator effective to enable radiation curing of the composition through the ethylenically unsaturated groups of resins a) and b); and, d) a thermal initiator effective to enable thermal curing of the composition through the ethylenically unsaturated groups of resins a) and b) while not causing said blend to pre-react upon being melt processed, such that said composition is suitably flowable at low flow temperatures between about 160° F. and about 250° F. as it is melted for curing and is suitably curable, both on the surface and through, when exposed to sufficient thermal and either ultraviolet or electron beam radiation.

28. The composition of claim 27, which further comprises:

e) an opacifier selected from pigments, fillers, and mixtures thereof.

* * * * *